(12) United States Patent
Ueta et al.

(10) Patent No.: US 7,992,463 B2
(45) Date of Patent: Aug. 9, 2011

(54) SHIFTER FOR AUTOMATIC TRANSMISSION (75) Inventors: Mizuho Ueta, Fuchu-cho (JP); Takumi Kusayama, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 12/792,032

(22) Filed: Jun. 2, 2010

(65) Prior Publication Data

US 2010/0307277 A1 Dec. 9, 2010

(30) Foreign Application Priority Data

Jun. 8, 2009 (JP) .................. 2009-137125

(51) Int. Cl.
G05G 9/00 (2006.01)
B60K 20/00 (2006.01)
F16H 59/04 (2006.01)

(52) U.S. Cl. .................. 74/473.18; 74/473.34

(58) Field of Classification Search .............. 74/473.1, 74/473.18, 473.33, 473.34, 471 XY, 473.3
See application file for complete search history.

(56) References Cited

U.S. PATENT DOCUMENTS

| | | | | |
|---|---|---|---|---|
| 5,622,079 A | * | 4/1997 | Woeste et al. .................... | 74/335 |
| 5,689,996 A | * | 11/1997 | Ersoy .............................. | 74/335 |
| 5,799,539 A | | 9/1998 | Haase | |
| 6,230,579 B1 | * | 5/2001 | Reasoner et al. ........... | 74/473.18 |
| 7,001,308 B2 | * | 2/2006 | Henneken et al. ............. | 477/121 |
| 7,028,576 B2 | * | 4/2006 | Zelman ...................... | 74/473.18 |

FOREIGN PATENT DOCUMENTS

| | | |
|---|---|---|
| JP | 6-94111 | 4/1994 |
| JP | 2005-119440 | 5/2005 |
| JP | 2007-230424 | 9/2007 |

\* cited by examiner

*Primary Examiner* — Thomas R Hannon
*Assistant Examiner* — Phillip A Johnson
(74) *Attorney, Agent, or Firm* — Gerald E. Hespos; Michael J. Porco (57) ABSTRACT

A shifter for an automatic transmission has a gate plate with a main gate and a sub-gate. A shift lever has a spherical portion and is movable along the main gate and the sub-gate. A switching member enables switching the automatic transmission to a manual operation. The switching member includes a body held in a swingable manner, and a lever holding section integrally formed with the body to rotatably hold the spherical portion. The body is adapted, to be uncoupled from the shift lever so as to place the automatic transmission in a manual mode when the shift lever is swung from the main gate into the sub-gate about the spherical portion and to be coupled to the shift lever so as to return the automatic transmission to an automatic mode when the shift lever is returned from the sub-gate to the main gate.

1 Claim, 7 Drawing Sheets

SHIFTER FOR AUTOMATIC TRANSMISSION

BACKGROUND OF THE INVENTION

1. Field of the Invention

The present invention relates to a shifter for an automatic transmission.

2. Description of the Related Art

Heretofore, a shifter for an automatic transmission used in a vehicle such as an automobile has been widely known. As the automatic transmission shifter, there has been known one type adapted to arbitrarily switch between an automatic mode and a manual mode. This type of automatic transmission shifter capable of switching between an automatic mode and a manual mode is proposed, for example, in JP 2007-230424A.

A shifter disclosed in JP 2007-230424A comprises a shift lever which has a spherical portion provided at a lower end thereof and held by a shifter base rotatably in a frontward-rearward direction and in a rightward-leftward direction, wherein the shift lever is coupled to an automatic transmission via a cable. The shifter further comprises a transmission mode-switching member which is attached to the shifter base swingably in the frontward-rearward direction and adapted to be switchably coupled to and uncoupled from the shift lever. In the shifter, when the shift lever is manually moved in the frontward-rearward direction along a main gate provided in a gate plate, the transmission mode-switching member is swingably moved in the frontward-rearward direction, so that the automatic transmission can be operated in an automatic mode. Otherwise, when the shift lever is manually moved from the main gate into a sub-gate on a right side thereof, the shift lever is swingably moved in a rightward direction about the spherical portion and thereby uncoupled from the transmission mode-switching member, so that a shift mode of the automatic transmission is switched from the automatic mode to a manual mode.

In the shifter disclosed in JP 2007-230424A, the shift lever and the transmission mode-switching member to be coupled together or uncoupled from each other are assembled to the shifter base individually. Consequently, this structure is likely to cause a variation in relative positional relationship between the shift lever and the transmission mode-switching member. If such a variation in positional relationship therebetween occurs, it will become difficult to smoothly switch between the coupled state and the uncoupled state. Moreover, it will become difficult to improve positional accuracy of each of the shift lever and the transmission mode-switching member with respect to a plurality of range positions set in the main gate and sub-gate.

SUMMARY OF THE INVENTION

It is an object of the present invention to provide an automatic transmission shifter capable of smoothly switching between a coupled state and an uncoupled state of a change lever with respect to a transmission mode-switching member, without a risk of the occurrence of a variation in relative positional relationship between the change lever and the transmission mode-switching member.

In order to achieve the object, according to one aspect of the present invention, there is provided a shifter for an automatic transmission provided in a vehicle. The shifter comprises a gate plate having a main gate and a sub-gate each formed therein, a shift lever having a spherical portion and being movable along the main gate and the sub-gate, and a transmission mode-switching member for switching a shift mode of the automatic transmission according to a manual operation of the shift lever. The transmission mode-switching member includes a switching member body held in a swingable manner, and a lever holding section integrally formed with the switching member body to rotatably hold the spherical portion. The switching member body is adapted, when the shift lever is swingably moved from the main gate into the sub-gate about the spherical portion, to be uncoupled from the shift lever so as to place the automatic transmission in a manual mode, and, when the shift lever is returned from the sub-gate to the main gate, to be coupled to the shift lever so as to return the automatic transmission to an automatic mode.

DETAILED DESCRIPTION OF THE PREFERRED EMBODIMENTS

With reference to the drawings, the best mode for carrying out the present invention will now be specifically described.

Figure 1:
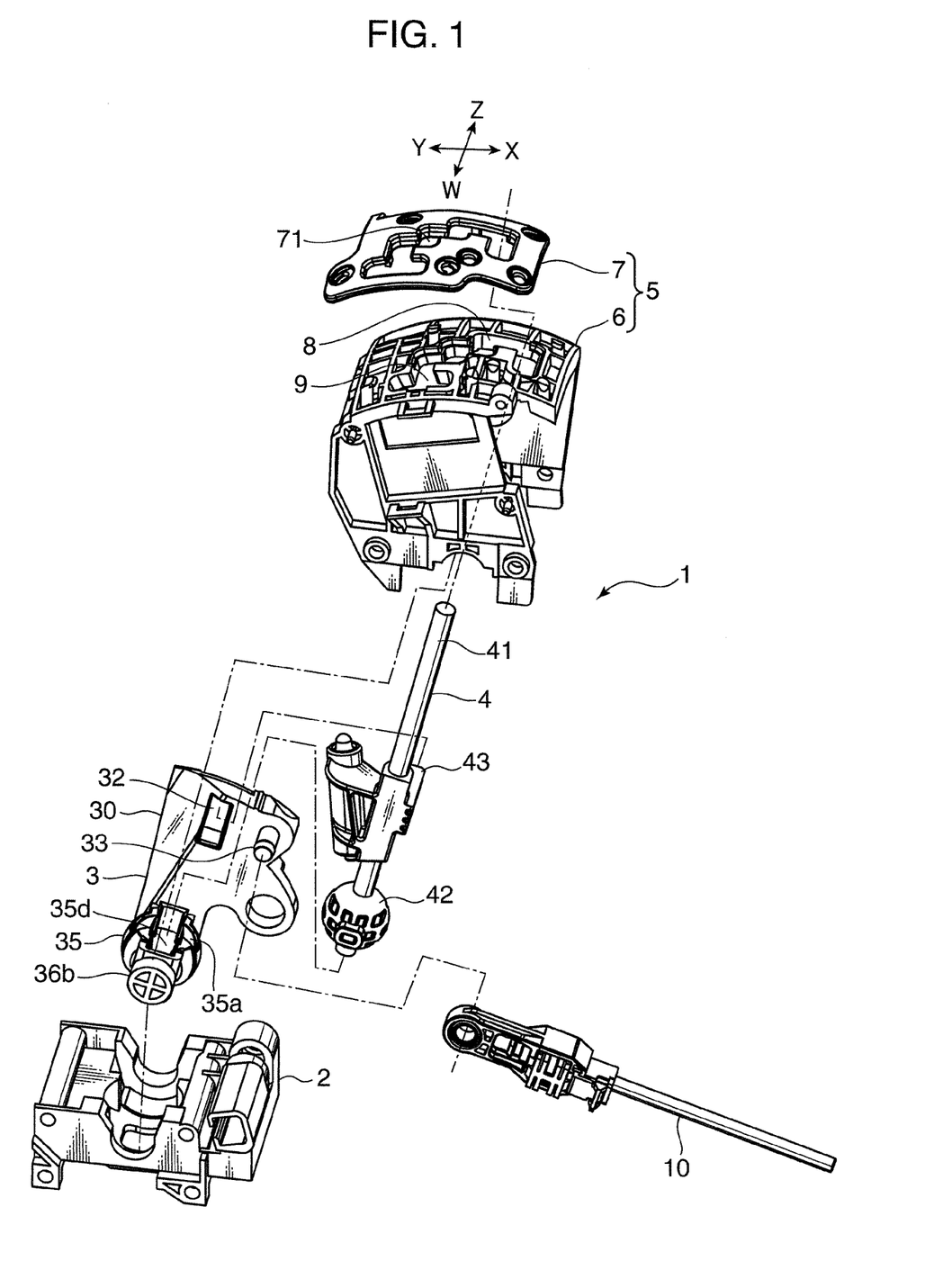
FIG. 1 is a fragmentary exploded perspective view of an automatic transmission shifter according to one embodiment of the present invention.
Figure 2:
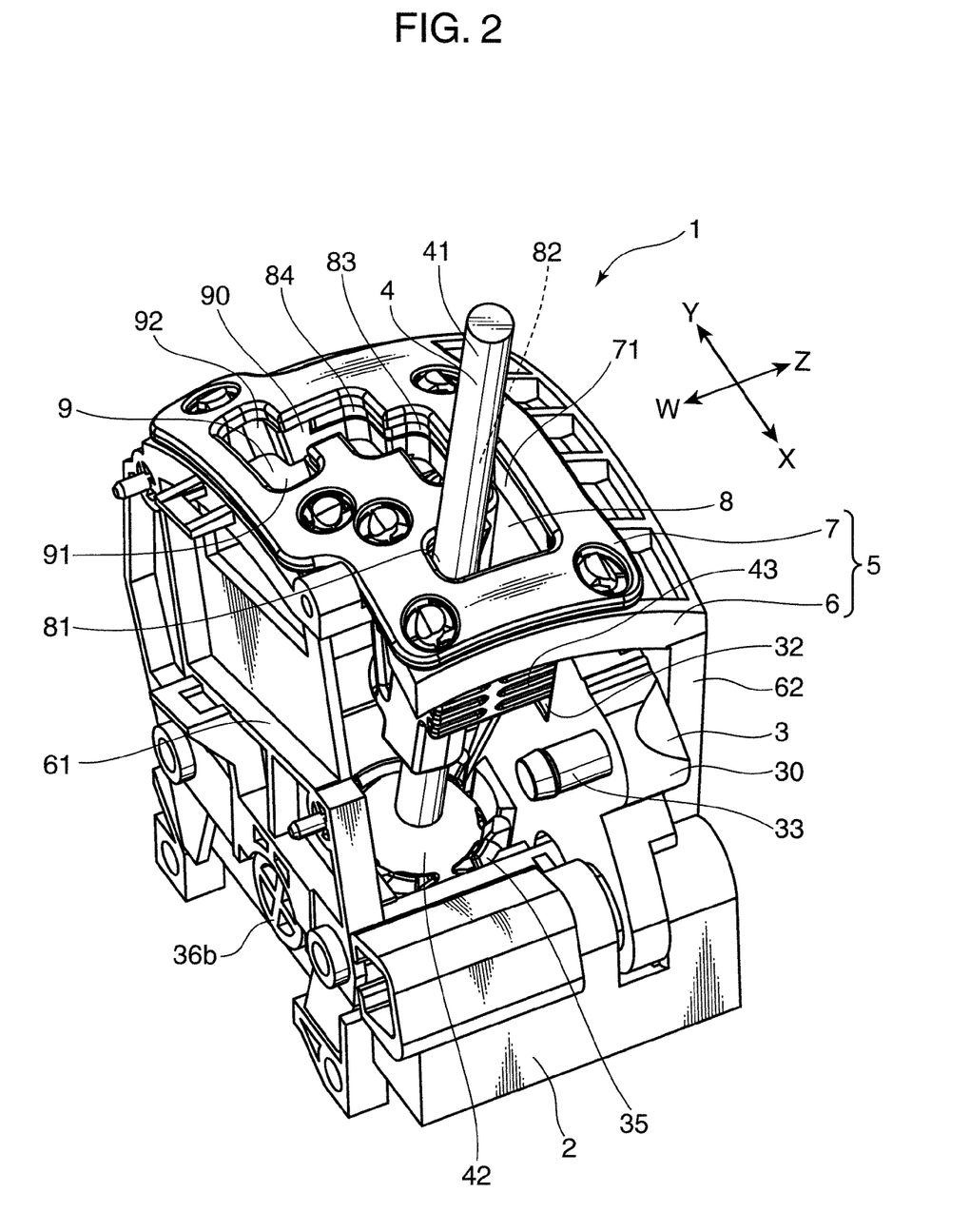
FIG. 2 is a fragmentary perspective view of the automatic transmission shifter, wherein a shift lever is placed at a parking range position in a main gate.

FIG. 1 is a fragmentary exploded perspective view of an automatic transmission shifter according to one embodiment of the present invention. FIG. 2 is a perspective view of the automatic transmission shifter, wherein a shift lever is placed at a parking range position. In the figures, the X-direction indicates a frontward direction of a vehicle, and the Y-direction indicates a rearward direction of the vehicle. Further, the Z-direction indicates a leftward direction of the vehicle, and the W-direction indicates a rightward direction of the vehicle.

The automatic transmission shifter 1 according to this embodiment is designed for an automobile. As shown in FIGS. 1 and 2, the automatic transmission shifter 1 comprises a shifter base 2 adapted to be fixed to an automobile body, a transmission mode-switching member 3, a shift lever 4, and a gate plate 5.

Figure 3:
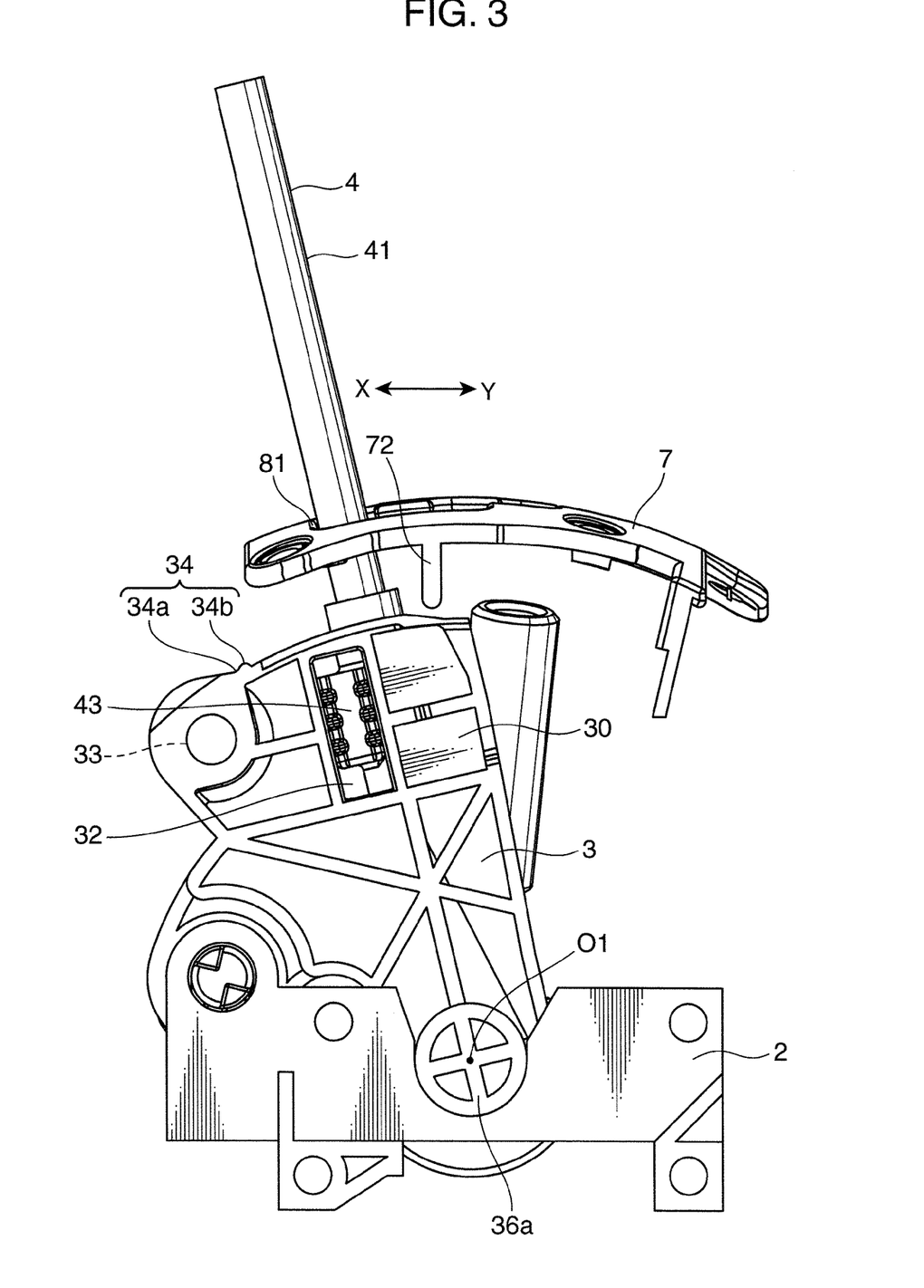
FIG. 3 is a side view showing a positional relationship between a switching member body and an auxiliary plate, in the state illustrated in FIG. 2.
Figure 4:
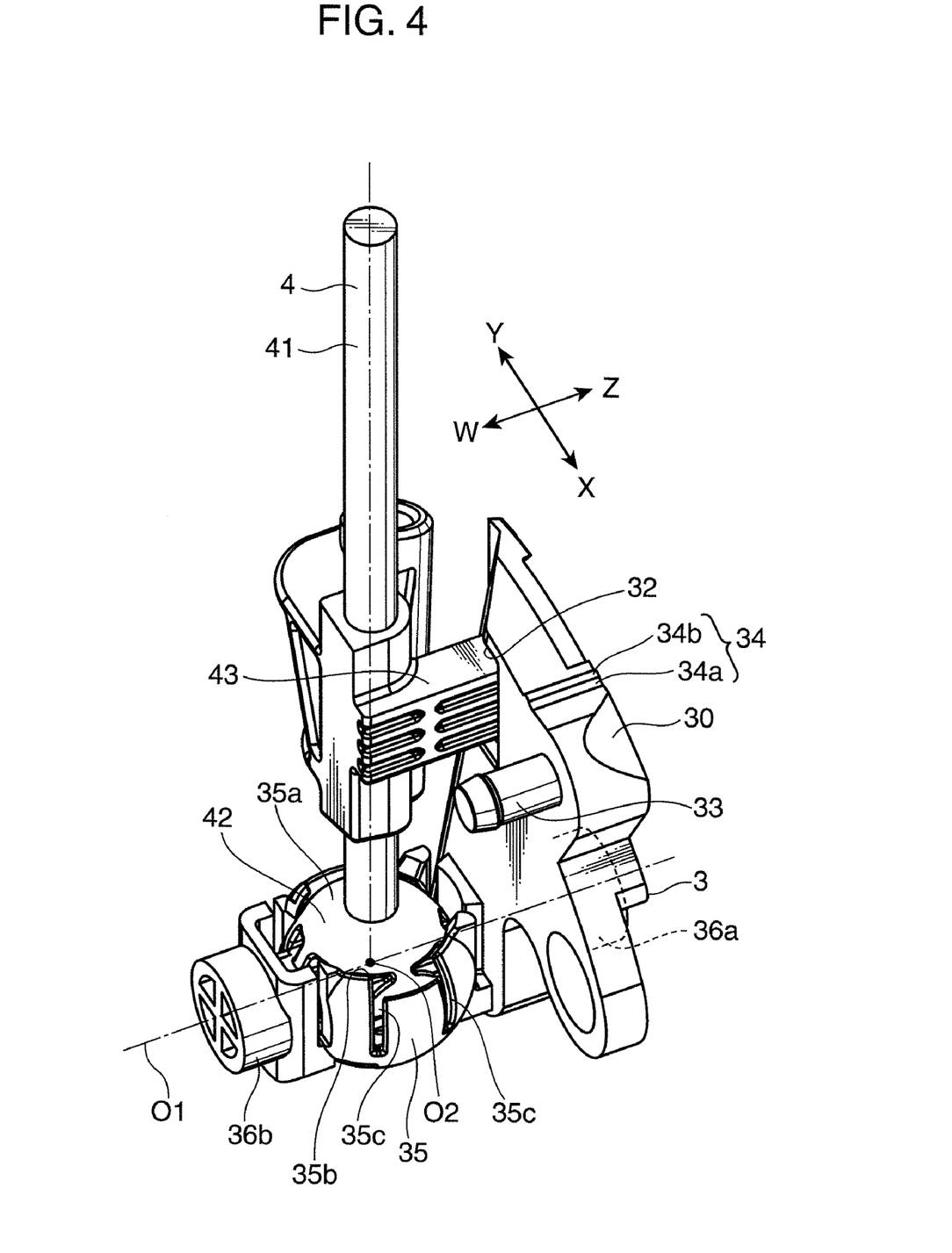
FIG. 4 is a perspective view showing a positional relationship between the switching member body and the shift lever, in the state illustrated in FIG. 2.

As shown in FIGS. 3 and 4, in this embodiment, the transmission mode-switching member 3 includes a plate-shaped switching member body 30, a lever holding section 35 adapted to hold the shift lever 4, and a shaft section (36a, 36b) for allowing the transmission mode-switching member 3 to be attached to the shifter base 2.

The switching member body 30 has a cable connection portion 33 provided on an upper and front region of a right surface thereof and adapted to be connected to one end of a cable 10 (illustrated in FIG. 1). The other end of the cable 10 is connected to an automatic transmission (not shown) provided in the automobile, so that the transmission mode-switching member 3 is coupled to the automatic transmission via the cable 10.

Further, the switching member body 30 has a locking portion 34 provided on a front region of a top surface thereof and adapted to lock an after-mentioned engagement piece 72 provided on the gate plate 5. The locking portion 34 in this embodiment includes a locking recess 34a, and a protruding wall 34b provided rearward of the locking recess 34a to protrude upwardly from the top surface of the switching member body 30 (see FIG. 3). The top surface of the switching member body 30 has a region located rearward of the locking portion 34 and formed in an arc shape with a center on an after-mentioned axis O1.

Further, the switching member body 30 has a rectangular-shaped coupling hole 32 formed approximately in the center of an upper portion thereof in the frontward-rearward direction to penetrate in a thickness direction thereof (the rightward-leftward direction; the W-Z direction in FIG. 1).

The lever holding section 35 is integrally formed with the switching member body 30 to protrude from the switching member body 30. In this embodiment, the lever holding section 35 is connected to the switching member body 30 on one side (right side) of the switching member body 30, i.e., on the side of the W-direction in FIG. 4. A connected position between the lever holding section 35 and the switching member body 30 is located downward of the coupling hole 32.

The lever holding section 35 has a spherical receiving portion 35b formed in a generally spherical shape to have an opening 35a at a top thereof. A plurality of slits 35c are formed in the spherical receiving portion 35b, so that an upper portion of the lever holding section 35 is divided into a plurality of pieces by the slits 35c.

Thus, in an operation of pushing an after-mentioned spherical portion 42 of the shift lever 4 into the spherical receiving portion 35b, the opening 35a is expanded to allow the spherical portion 42 to be smoothly inserted. Then, after the spherical portion 42 is inserted, the spherical receiving portion 35b is returned to its original shape so as to rotatably hold the spherical portion 42.

As shown in FIG. 4, the shaft section comprises a first shaft portion 36a and a second shaft portion 36b. The first shaft portion 36a is integrally formed with the switching member body 30 at a lower end of the switching member body 30. The first shaft portion 36a is provided to protrude from the switching member body 30 in the Z-direction (in a rightward direction in FIG. 4; provided at a position on the other side of the switching member body 30). In other words, the first shaft portion 36a is provided on the switching member body 30 at an opposite side of the lever holding section 35 with respect to the switching member body 30, to extend in a direction perpendicular to the switching member body 30 and parallel to the thickness direction of the switching member body 30.

The second shaft portion 36b is provided to protrude from the lever holding section 35 in the W-direction (in a leftward direction in FIG. 4; provided at a position on the one side of the switching member body 30). In other words, the second shaft portion 36b is provided on the lever holding section 35 at an opposite side of the switching member body 30 with respect to the lever holding section 35.

The first shaft portion 36a and the second shaft portion 36b are coaxially arranged to have the same axis O1. The axis O1 passes through a center O2 of the spherical receiving portion 35b.

Each of the first shaft portion 36a and the second shaft portion 36b is rotatably supported by the shifter base 2, so that the upper portion of the switching member body 30 can be swingably moved in the frontward-rearward direction (X-Y direction) about the axis O1.

As shown in FIGS. 1 to 4, the shift lever 4 is disposed at a position offset in the W-direction with respect to the switching member body 30. The shift lever 4 comprises a lever shaft 41, a spherical portion 42 provided at a lower end of the lever shaft 41, and a coupling piece 43 provided on an intermediate portion of the lever shaft 41 in an upward-downward direction. The coupling piece 43 is provided upward of the spherical portion 42.

The lever shaft 41 is composed of a circular column-shaped shaft, and a manual grip member (not shown) is attached to an upper end (distal end) of the lever shaft 41. A driver manually operates the shift lever 4 while gripping the manual grip member.

The spherical portion 42 is designed to serve as a pivoted portion to be held by the lever holding section 35, and formed in a spherical shape having a size capable of being rotatably fitted in the spherical receiving portion 35b of the lever holding section 35.

In an assembled state where the spherical portion 42 is held by the lever holding section 35, a center of the spherical portion 42 coincides with the center O2 of the spherical receiving portion 35b, so that the spherical portion 42 can be rotated about the center O2 while maintaining this state. Thus, the distal end of the shift lever 4 can be moved in the frontward-rearward direction (X-Y direction) and the rightward-leftward direction (W-Z direction) with respect to the switching member body 30.

The coupling piece 43 is formed in a cross-sectionally rectangular shape capable of being inserted into the coupling hole 32 of the switching member body 30, to protrude from the lever shaft 41 toward the switching member body 30 by a given length.

The coupling piece 43 formed in this manner is inserted into and pulled out of the coupling hole 32 of the switching member body 30, along with a swing movement of the lever shaft 41 in the rightward-leftward direction (W-Z direction) about the spherical portion 42 in the spherical receiving portion 35b. Specifically, the coupling piece 43 is inserted into the coupling hole 32 when the lever shaft 41 is inclined in the Z-direction, and pulled out of the coupling hole 32 when the lever shaft 41 is inclined in the W-direction.

As shown in FIGS. 1 and 2, the gate plate 5 comprises a plate-shaped plate body 6, and an auxiliary plate 7 disposed on an upper side of the plate body 6 in a laminated manner. The plate body 6 has a gate (8, 9) for guiding the lever shaft 41.

In this embodiment, the gate includes a main gate 8 for guiding the lever shaft 41 in an automatic mode, and a sub-gate 9 for guiding the lever shaft 41 in a manual mode.

The main gate 8 has a parking (P) range position 81, a reverse (R) range position 82 communicated with the parking (P) range position 81, a neutral (N) range position 83 communicated with the reverse (R) range position 82, and a drive (D) range position 84 communicated with the neutral (N) range position 83.

The sub-gate 9 is communicated with the drive range position 84 in the main gate 8 through a communication path 90. The sub-gate 9 comprises a minus gate 91 and a plus gate 92.

The plate body 6 in this embodiment is provided with a right sidewall 61 and a left sidewall 62 each extending downwardly from the plate body 6. The plate body 6 is fixed to the shifter base 2 by fixing respective lower portions of the right sidewall 61 and the left sidewall 62 to the shifter base 2.

The auxiliary plate 7 is a member which is provided to suppress a hitting sound which would otherwise occur when the lever shaft 41 is moved along the main gate 8 and the sub-gate 9, and made of a flexible material which is softer than the plate body 6, and less likely to generate a hitting sound when the lever shaft 41 hits thereagainst. In this embodiment, the auxiliary plate 7 is made of a urethane-based elastomer.

The auxiliary plate 7 has a sound-absorbing gate 71 corresponding to the main gate 8 and the sub-gate 9. Although not illustrated, the sound-absorbing gate 71 is formed to have a width slightly less than that of each of the main gate 8 and the sub-gate 9, so that an inner peripheral edge of the sound-absorbing gate 71 in the auxiliary plate 7 protrudes inwardly from an inner peripheral edge of each of the main gate 8 and the sub-gate 9. Thus, when the lever shaft 41 is moved along the main gate 8 and the sub-gate 9, the lever shaft 41 is brought into contact with an inner side surface of the sound-absorbing gate 71. This makes it possible to suppress the occurrence of the hitting sound.

As shown in FIG. 3, the auxiliary plate 7 is provided with an engagement piece 72 having elasticity. The engagement piece 72 in this embodiment is integrally formed with the auxiliary plate 7 to have a cross-sectionally circular shape and protrude downwardly from a lower surface of the auxiliary plate 7 by a given length.

The auxiliary plate 7 formed in this manner is fixed to the plate body 6 while being laminated on the upper side of the plate body 6. During this operation, the engagement piece 72 is inserted into a hole (not shown) formed in the plate body 6, to protrude downwardly from a lower surface of the plate body 6. In this state, the engagement piece 72 is located above the top surface of the switching member body 30.

More specifically, a lower end (distal end) of the engagement piece 72 protruding downwardly from the lower surface of the plate body 6 after penetrating through the hole of the plate body 6 is located at a position spaced apart upwardly from a rear region of the top surface of the switching member body 30 by a given distance. Thus, even if the switching member body 30 is swingably moved, the engagement piece 72 is never brought into contact with the rear region of the top surface of the switching member body 30. On the other hand, during the swing movement of the switching member body 30, the lower end of the engagement piece 72 is brought into contact with the protruding wall 34b provided on the top surface of the switching member body 30.

An operation of the shifter 1 according to this embodiment will be described after briefly describing a process of assembling the shifter 1.

When the shift lever 4 and the transmission mode-switching member 3 is assembled to the shifter base 2, the transmission mode-switching member 3 may be assembled to the shifter base 2 after holding the shift lever 4 by the transmission mode-switching member 3. More specifically, the spherical portion 42 of the shift lever 4 is put in the spherical receiving portion 35b of the lever holding section 35 to allow the shift lever 4 to be held by the transmission mode-switching member 3, and then the transmission mode-switching member 3 holding the shift lever 4 is assembled to the shifter base 2.

Thus, it becomes possible to eliminate a need for assembling the shift lever 4 and the transmission mode-switching member 3 to the shifter base 2 individually, as in the conventional shifter, to readily perform the assembling operation in a short period of time.

Further, after the assembling, the shift lever 4 can be swingably moved about the center O2 of the spherical receiving portion 35b of the transmission mode-switching member 3, so that a position and a movement of the shift lever 4 relative to the transmission mode-switching member 3 can be constantly set without variation.

Thus, it becomes possible to simplify positioning of both the shift lever 4 and the transmission mode-switching member 3 with respect to each of the range positions in the main gate 8 and the sub-gate 9, and improve positional accuracy of both the shift lever 4 and the transmission mode-switching member 3 with respect to each of the range positions.

When the lever shaft 41 of the shift lever 4 is placed at the parking (P) range position 81 in the main gate 8 (in the state illustrated in FIG. 2), the coupling piece 43 of the shift lever 4 is inserted into the coupling hole 32 of the switching member body 30, as shown in FIG. 4. Thus, the shift lever 4 and the switching member body 30 are coupled together.

Then, when the lever shaft 41 is moved from the parking (P) range position 81 in the main gate 8 to the reverse (R) range position 82 rearward of the parking (P) range position 81 according to a manual operation of the shift lever 4, the switching member body 30 is pushed rearwardly by the coupling piece 43 of the shift lever 4, because the coupled state is maintained. Thus, the switching member body 30 is swingably moved rearwardly together with the lever shaft 41, so that the cable 10 (see FIG. 1) is pulled to shift the automatic transmission to a reverse range.

During this operation, the center O2 of the spherical receiving portion 35b of the transmission mode-switching member 3 as a center of the swing movement of the shift lever 4 is located on the axis O1 of the shaft portions 36a, 36b as an axis of the swing movement of the switching member body 30 (see FIG. 4). Thus, a force received by the shift lever 4 is fully transmitted to the switching member body 30 as a force causing the swing movement of the switching member body 30, so that the switching member body 30 is swingably moved in a smooth manner.

Similarly, when the lever shaft 41 of the shift lever 4 is moved from the reverse range position 82 to the neutral range position 83 rearward of the reverse range position 82, and then moved from the neutral range position 83 to the drive range position 84, the switching member body 30 is swingably moved together with the lever shaft 41 of the shift lever 4 while maintaining the coupled state. Thus, the switching member body 30 is pushed rearwardly by the coupling piece 43 of the shift lever 4, and swingably moved rearwardly together with the lever shaft 41. In this way, the cable 10 is pulled to shift the automatic transmission to a neutral range and then to a drive range.

When the lever shaft 41 of the shift lever 4 is moved from the neutral range position 83 to the drive range position 84, the protruding wall 34b of the switching member body 30 is brought into contact with the engagement piece 72 of the auxiliary plate 7, to push the lower end of the engagement piece 72 rearwardly.

Figure 6:
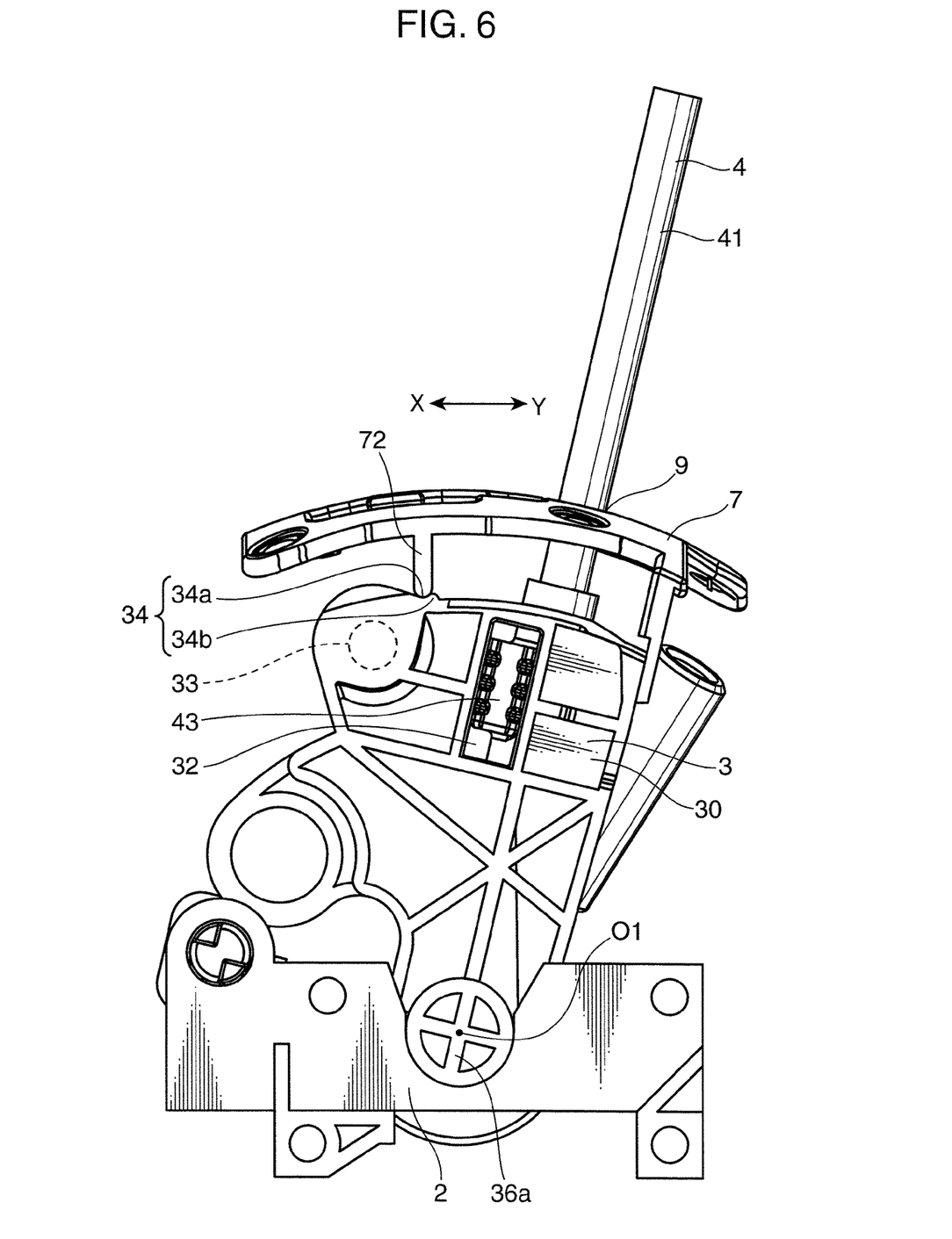
FIG. 6 is a side view showing a positional relationship between the switching member body and the auxiliary plate, in the state illustrated in FIG. 5.
Figure 7:
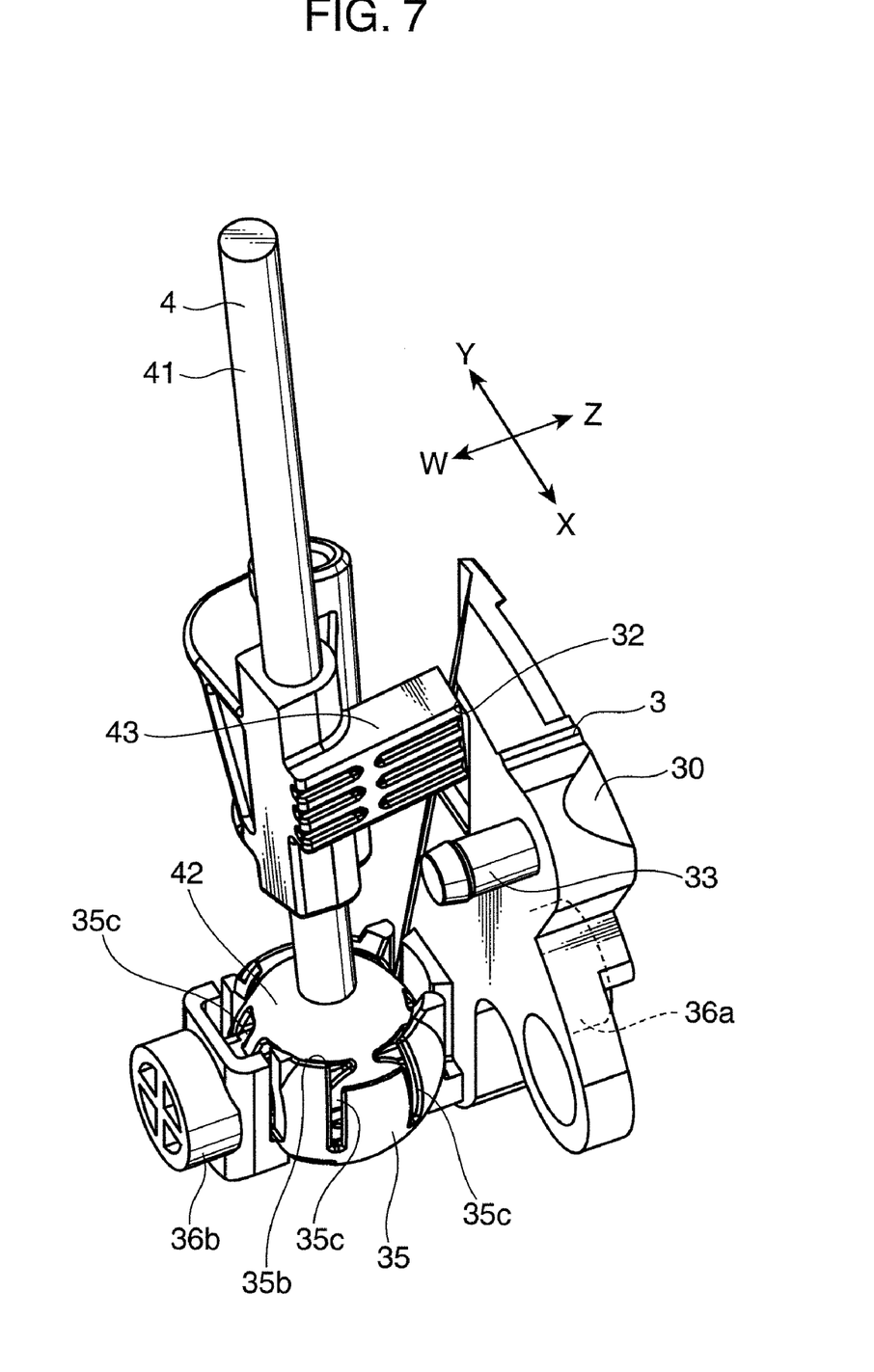
FIG. 7 is a perspective view showing a positional relationship between the switching member body and the shift lever, in the state illustrated in FIG. 5.

Thus, the engagement piece 72 is gradually bent into a curved shape. Then, when the lever shaft 41 reaches a position corresponding to the drive range position 84, the protruding wall 34b passes through the engagement piece 72 to allow the engagement piece 72 to be engaged in the locking recess 34a. The engagement piece 72 after being engaged in the locking recess 34a is placed in a state where a surface of the distal end of the engagement piece 72 is approximately entirely in contact with an inner surface of the locking recess 34a, as shown in FIG. 6.

Figure 5:
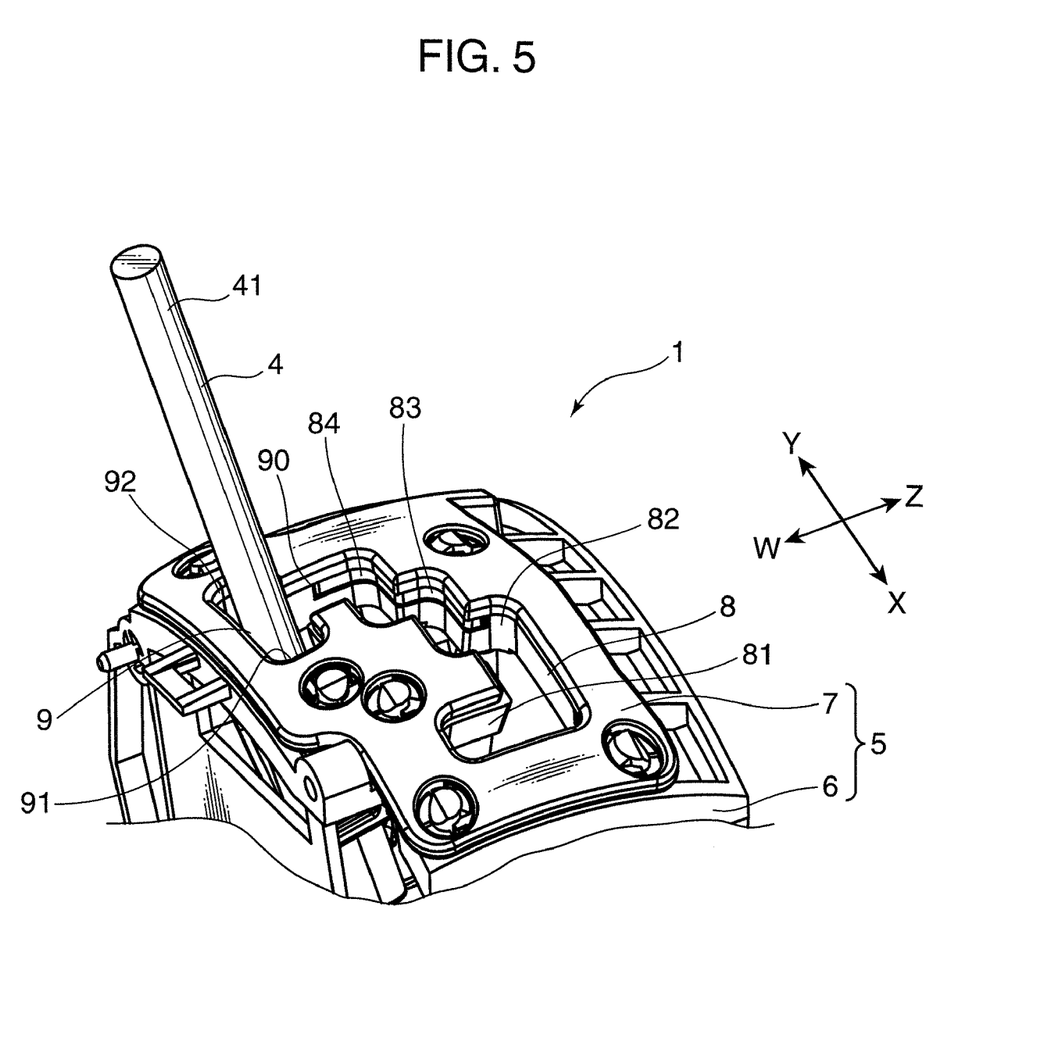
FIG. 5 is a fragmentary perspective view of the automatic transmission shifter, wherein the shift lever is placed in a sub-gate.

Then, when the lever shaft 41 of the shift lever 4 is manually moved from the drive range position 84 into the sub-gate 9 on a right side thereof through the communication path 90, as shown in FIG. 5, the coupling piece 43 of the shift lever 4 is placed in a state where it is pulled out of the coupling hole 32 of the switching member body 30. Thus, the shift lever 4 and the switching member body 30 are placed in an uncoupled state.

Thus, in the uncoupled state, the shift lever 4 and the switching member body 30 are not moved in an interlocking manner, so that, even if the shift lever 4 is moved along the sub-gate 9 in the frontward-rearward direction, the automatic transmission will be maintained in the drive range.

Further, in the uncoupled state, the engagement piece 72 of the gate plate 5 is engaged in the locking recess 34a of the switching member body 30, so that the switching member body 30 is kept at the locked position without a swing movement.

In this embodiment, when the lever shaft 41 is moved into the communication path 90, a manual-mode detection device (not shown) provided on the shifter base 2 is operable to detect the movement of the shift lever 4 and generate a signal indicative of switching to the manual mode. Then, when the lever shaft 41 is moved to the minus gate 91 of the sub-gate 9, a detection device (not shown) provided on the shifter base 2 is operable to detect the movement, and a control section (not shown) provided on the shifter base 2 is operable, based on the detection, to shift down the automatic transmission by one gear.

Otherwise, when the lever shaft 41 is moved to the plus gate 92 of the sub-gate 9, the detection device is operable to detect the movement, and the control section is operable, based on the detection, to shift up the automatic transmission by one gear.

Subsequently, when the lever shaft 41 of the shift lever 4 is returned from the sub-gate 9 to the drive range position 84 through the communication path 90, the coupling piece 43 of the shift lever 4 is re-inserted into the coupling hole 32 of the switching member body 30. Thus, the shift lever 4 and the switching member body 30 are re-placed in the coupled state.

During this operation, the switching member body 30 is locked by the engagement piece 72, so that it is maintained at the position when uncoupled from the shift lever 4. Thus, the coupling piece 43 and the coupling hole 32 are aligned with each other without a displacement. Therefore, the coupling piece 43 is easily inserted into the coupling hole 32, which makes it possible to prevent a situation where the coupling piece 43 cannot be inserted into the coupling hole 32 due to interference with a peripheral edge of the coupling hole 32.

Then, when the lever shaft 41 of the shift lever 4 is manually moved from the drive range position 84 to the neutral range position 83 in the main gate 8, the switching member body 30 coupled to the shift lever 4 is swingably moved in a direction opposite to the aforementioned direction (frontwardly).

During the swing movement, the engagement piece 72 engaged in the locking portion 34 is gradually bent into a curved shape, and the protruding wall 34b passes through the engagement piece 72. Thus, the locked state between the locking portion 34 and the engagement piece 72 is released.

Although the axis O1 of the first shaft portion 36a and the second shaft portion 36b in the above embodiment is defined to pass through the center O2 of the spherical receiving portion 35b, the present invention is not limited thereto. For example, the first shaft portion 36a and the second shaft portion 36b may be arranged such that the axis O1 is displaced from the center O2 of the spherical receiving portion 35b.

The above embodiment can be summarized as follows.

(1) In the shifter according to the above embodiment, a transmission mode-switching member includes a switching member body connected to a cable, and a lever holding section which holds a spherical portion of a shift lever, wherein the lever holding section is integrally formed with the switching member body. Thus, in an assembled state where the shift lever is held by the lever holding section, a position of the shift lever relative to the transmission mode-switching member is constantly set without variation. Thus, it becomes possible to eliminate a variation in relative positional relationship between the transmission mode-switching member and the shift lever. This makes it possible to provide a shifter capable of smoothly switching between a coupled state and an uncoupled state of the shift lever with respect to the transmission mode-switching member.

In addition, it becomes possible to simplify positioning of both the shift lever and the transmission mode-switching member with respect to each of a plurality of range positions in a main gate and a sub-gate, and improve positional accuracy of both the shift lever and the transmission mode-switching member with respect to each of the range positions.

(2) Preferably, the shifter according to the above embodiment further comprises a shifter base adapted to be fixed to a vehicle, wherein the transmission mode-switching member further includes a shaft section which rotatably supports the switching member body and the lever holding section with respect to the shifter base, and wherein: the lever holding section is integrally formed with the switching member body at a position on one side of the switching member body; and the shaft section comprises a first shaft portion integrally formed with the switching member body at a position on the other side of the switching member body, and a second shaft portion integrally formed with the lever holding section at a position on one side of the switching member body.

In this case, a center of the lever holding section, i.e., a center of the spherical portion serving as a center of a swing movement of the shift lever, can be set to coincide with an axis of a swing movement of the switching member body. Thus, a force received by the shift lever can be fully transmitted to the switching member body as a force causing the swing movement of the switching member body. This makes it possible to swingably move the switching member body in a smooth manner.

This application is based on Japanese Patent Application No. 2009-137125 filed on Jun. 8, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shifter for an automatic transmission provided in a vehicle, comprising:
   a gate plate having a main gate and a sub-gate each formed therein;
   a shift lever having a spherical portion, the shift lever being movable along the main gate and the sub-gate;
   a shifter base adapted to be fixed to the vehicle; and
   a transmission mode-switching member for switching a shift mode of the automatic transmission according to a manual operation of the shift lever, the transmission mode-switching member including a switching member body held in a swingable manner, and a lever holding section integrally formed with the switching member body to rotatably hold the spherical portion, wherein the lever holding section has opposite first and second sides, a spherical receiving portion integrally formed on the second side of the lever holding section, the spherical receiving portion having an opening at a top thereof and receives the spherical portion to rotatably hold the spherical portion, wherein the transmission mode-switching member includes a shaft section which rotatably supports the switching member body and the lever holding section with respect to the shifter base, wherein the shaft section comprises a first shaft portion integrally formed with the switching member body at a position on the first side of the switching member body, and a second shaft portion integrally formed with the spherical receiving portion of the lever holding section at a position on the second side of the switching member body, the second shaft portion being coaxially arranged to the first shaft portion, and wherein the switching member body is adapted, when the shift lever is swingably moved from the main gate into the sub-gate about the spherical portion, to be uncoupled from the shift lever so as to place the automatic transmission in a manual mode, and, when the shift lever is returned from the sub-gate to the main gate, to be coupled to the shift lever so as to return the automatic transmission to an automatic mode.

\* \* \* \* \*